United States Patent
Sahoo et al.

(10) Patent No.: US 12,549,669 B2
(45) Date of Patent: *Feb. 10, 2026

(54) SYSTEM AND METHOD TO EVALUATE MICROSERVICES INTEGRATED IN INTERACTIVE VOICE RESPONSE (IVR) OPERATIONS

(71) Applicant: Bank of America Corporation, Charlotte, NC (US)

(72) Inventors: Amiya R Sahoo, Frisco, TX (US); Nipun Mahajan, Lawrenceville, NJ (US); Scott S Randrup, Sammamish, WA (US); Robert E Lutzkow, Phillipsburg, NJ (US); Anand Daniel, Little Elm, TX (US); Dinesh Kumar Agrawal, Forney, TX (US); Yogesh Raghuvanshi, Pennington, NJ (US); Sergey Alexandrov, Somerset, NJ (US)

(73) Assignee: Bank of America Corporation, Charlotte, NC (US)

( * ) Notice: Subject to any disclaimer, the term of this patent is extended or adjusted under 35 U.S.C. 154(b) by 158 days.

This patent is subject to a terminal disclaimer.

(21) Appl. No.: 18/525,494

(22) Filed: Nov. 30, 2023

(65) Prior Publication Data
US 2025/0184428 A1 Jun. 5, 2025

(51) Int. Cl.
*H04M 3/493* (2006.01)
(52) U.S. Cl.
CPC .................. *H04M 3/4936* (2013.01)
(58) Field of Classification Search
CPC .................................... H04M 3/493

USPC ............. 379/88, 201, 88.01, 201.01
See application file for complete search history.

(56) References Cited

U.S. PATENT DOCUMENTS

| | | |
|---|---|---|
| 7,139,706 B2 | 11/2006 | Yuschik |
| 9,983,860 B1 | 5/2018 | Koty et al. |
| 10,169,220 B2 | 1/2019 | Rajagopalan et al. |
| 10,637,952 B1 | 4/2020 | Koenig et al. |
| 10,684,940 B1 * | 6/2020 | Kayal .................. G06F 11/3688 |

(Continued)

OTHER PUBLICATIONS

Amiya R. Sahoo, System and method to integrate microservices in Interactive Voice Response (IVR) operations, U.S. Appl. No. 18/475,747, filed Sep. 27, 2023, pp. 1-40.

*Primary Examiner* — Ahmad F. Matar (57) ABSTRACT

An apparatus may comprise a memory communicatively coupled to a processor. The processor may be configured to receive an evaluation request to perform multiple data processing operations; determine a microservice configured to fulfill the first evaluation request; and determine multiple publishing commands associated with the microservice. The one or more microservices may be integrated in multiple Interactive Voice Response (IVR) operations. The processor may be further configured to obtain input parameters of the one or more input parameters corresponding to the microservice; generate a response to the evaluation request associated with the microservice, compare the response to an expected response of the one or more expected responses; and determine whether the response matches the expected response. In response to determining that the response does not match the expected response, the processor is configured to update the publishing commands in accordance with multiple rules and policies, and publish the microservice.

20 Claims, 3 Drawing Sheets

(56) References Cited

U.S. PATENT DOCUMENTS

| | | |
|---|---|---|
| 10,841,392 B2 * | 11/2020 | Walsh .................... G06F 9/4451 |
| 10,862,733 B2 | 12/2020 | Jaeger |
| 10,866,851 B2 * | 12/2020 | Basiri ..................... H04L 43/50 |
| 11,023,215 B2 | 6/2021 | Biskup et al. |
| 11,134,152 B2 | 9/2021 | McGann et al. |
| 11,272,026 B2 | 3/2022 | Walsh et al. |
| 11,562,267 B2 | 1/2023 | Polleri et al. |
| 11,599,752 B2 | 3/2023 | Briancon et al. |
| 11,748,487 B2 * | 9/2023 | Ranjan ................ G06F 11/3698 |
| | | 726/25 |
| 2019/0156199 A1 | 5/2019 | Reeve et al. |
| 2021/0279047 A1 * | 9/2021 | McLaren ............ G06F 11/3698 |
| 2022/0247678 A1 | 8/2022 | Atwal et al. |
| 2023/0106170 A1 | 4/2023 | Huet |
| 2024/0143493 A1 * | 5/2024 | Michael ................ G06F 9/5077 |

\* cited by examiner

SYSTEM AND METHOD TO EVALUATE MICROSERVICES INTEGRATED IN INTERACTIVE VOICE RESPONSE (IVR) OPERATIONS

TECHNICAL FIELD

The present disclosure relates generally evaluate operations of a system configured to implement microservices as part of one or more Interactive Voice Response (IVR) operations, and more specifically to a system and method to evaluate microservices integrated in the IVR operations.

BACKGROUND

In a maintenance window, microservice operations are difficult to test without impacting any microservices in a same shared space. The maintenance window usually requires tests to be performed predetermined dedicated period of time which take the microservices offline and prevent users from engaging with any of the microservices.

SUMMARY OF THE DISCLOSURE

In one or more embodiments, a system and method are configured to evaluation microservices integrated in Interactive Voice Response (IVR) operations. The microservices comprise multiple small independent services that communicate over pre-defined application programming interfaces (APIs). These services may enable applications to scale, develop, enable innovation, and accelerate time-to-market for new features. The IVR operations may be performed by an automated communication system that enables incoming communications to access information via voice responses or pre-recorded messages, as well as to utilize menu options via touch tone keypad selection or speech recognition to route the communications to specific departments or specialists. In some embodiments, the system and method comprise a new architecture configured to update the microservices individually instead of updating all the microservices at once. Further, the system and method may be configured to evaluate (e.g., test) one or more of the microservices in the new architecture.

The system and method are configured to receive incoming communications from one or more user devices and identify an evaluation request from the incoming communications. The system and method may be configured to route the evaluation request via one or more sub-dialogs to one or more specific microservices configured to fulfill the evaluation request. The system and method may enable access between the evaluation request and the microservices. The microservices may be configured to provide responses to the one or more user devices and/or stored locally in the system. In some embodiments, the user devices may provide positive or negative feedback indicating whether the microservice provided a response that fulfilled the evaluation request. The system and method may be configured to evaluate whether the response matches one or more expected responses. In some embodiments, the system and method may update the microservice in isolation (e.g., individually) without updating all other microservices if the response does not match one or more of the expected responses. Upon updating the microservice in isolation, the system and method may publish the microservice.

In one or more embodiments, the system and method described herein are integrated into a practical application of reducing, preventing, or eliminating negative impacts of evaluating a microservice as part of a maintenance cycle. For example, the system and method may be configured to modify or update a microservice in isolation from any other microservices based on one or more results of an evaluation operation. The system and method may ensure stability of any systems related to the microservice during evaluation operations. In particular, the system and method evaluate one or more microservices integrated into the IVR operations such that the IVR operations may be taken out of operation to be modified in isolation. In some embodiments, significant human resources, processing resources, and memory resources may be saved when a microservice is updated based on the feedback obtained as part of the evaluation operations. In some embodiments, the system and method prevent the admin server from going into a hung state or from being unresponsive during maintenance windows because only specific microservices are evaluated and/or updated at any given time. In some embodiments, the microservices may be updated after a given microservice provides a response to one or more user devices. In other embodiments, the given microservice may be updated in isolation at a predefined time.

In one or more embodiments, the system and method are directed to improvements in computer systems. Specifically, the system and method reduce processor and memory usage in the admin server by improving microservice evaluations and microservice updates in applications associated with IVRs. In this regard, the system and method are configured to evaluate application operations in isolation after evaluating and fixing issues in the microservice without manually identifying or analyzing the IVR operations of the microservice during a maintenance window.

In one or more embodiments, the system and method may be performed by an apparatus, such as the server. Further, the system may comprise the apparatus. In addition, the system and method may be performed as part of a process performed by the apparatus. As a non-limiting example, the apparatus may comprise a memory communicatively coupled to a processor. The memory may be configured to store one or more publishing commands configured to enable one or more microservices integrated in multiple IVR operations to access one or more incoming requests, one or more input parameters, and one or more expected responses. Each input parameter may indicate an input for at least one of the one or more microservices. Each expected response indicating an expected output for at least one of the one or more microservices. The processor may be configured to receive an evaluation request to perform multiple data processing operations; determine a microservice configured to fulfill the first evaluation request; and determine multiple publishing commands associated with the microservice. The publishing commands are instructions configured to enable the microservice to access the evaluation request. The processor may be further configured to obtain input parameters of the one or more input parameters corresponding to the microservice; generate a response to the evaluation request associated with the microservice, compare the response to an expected response of the one or more expected responses; and determine whether the response matches the expected response. In response to determining that the response does not match the expected response, the processor is configured to update the publishing commands in accordance with multiple rules and policies, and publish the microservice. The publishing commands may be associated with the microservice being updated in isolation from the microservices.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
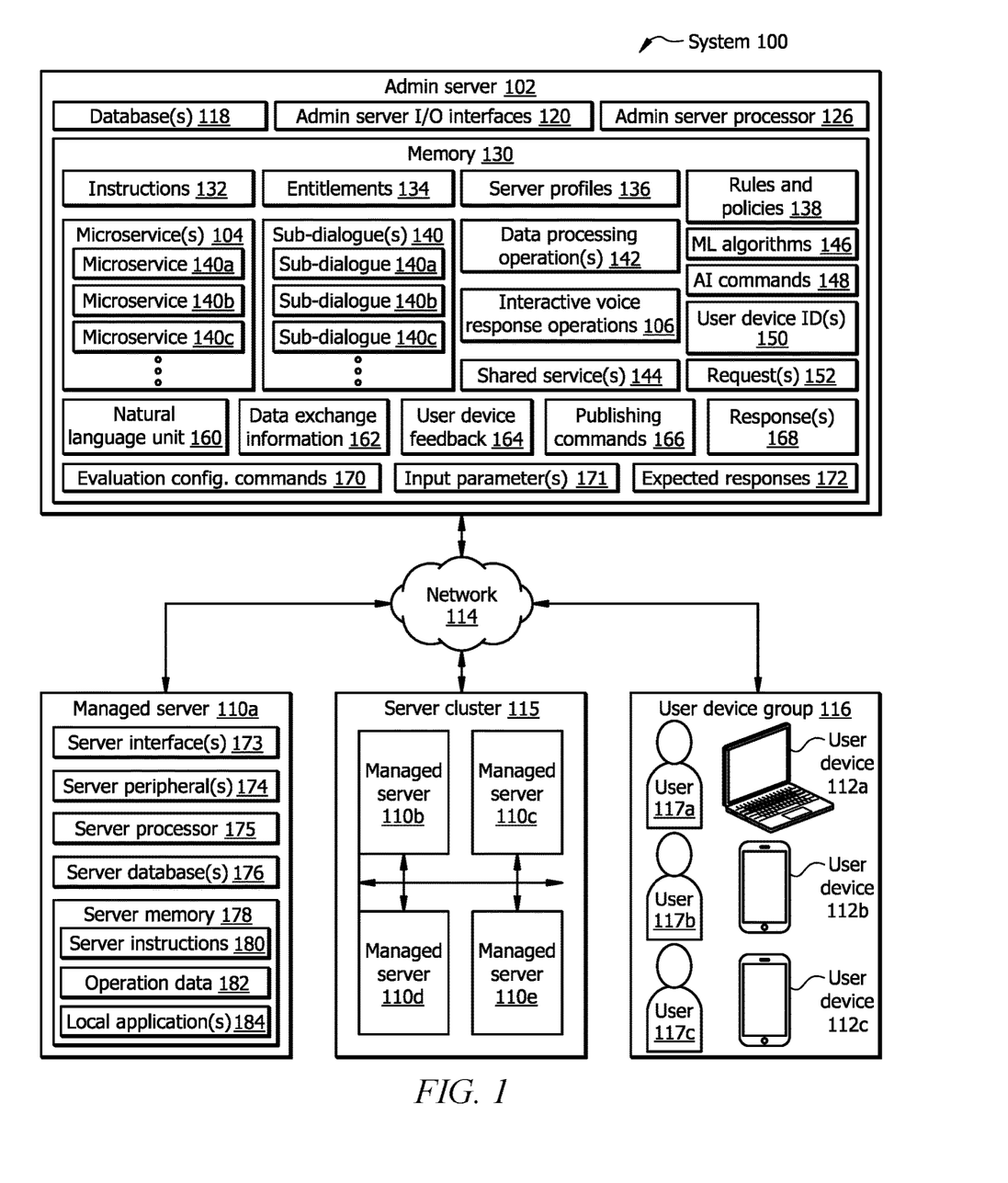
FIG. 1 illustrates a system in accordance with one or more embodiments.
Figure 2:
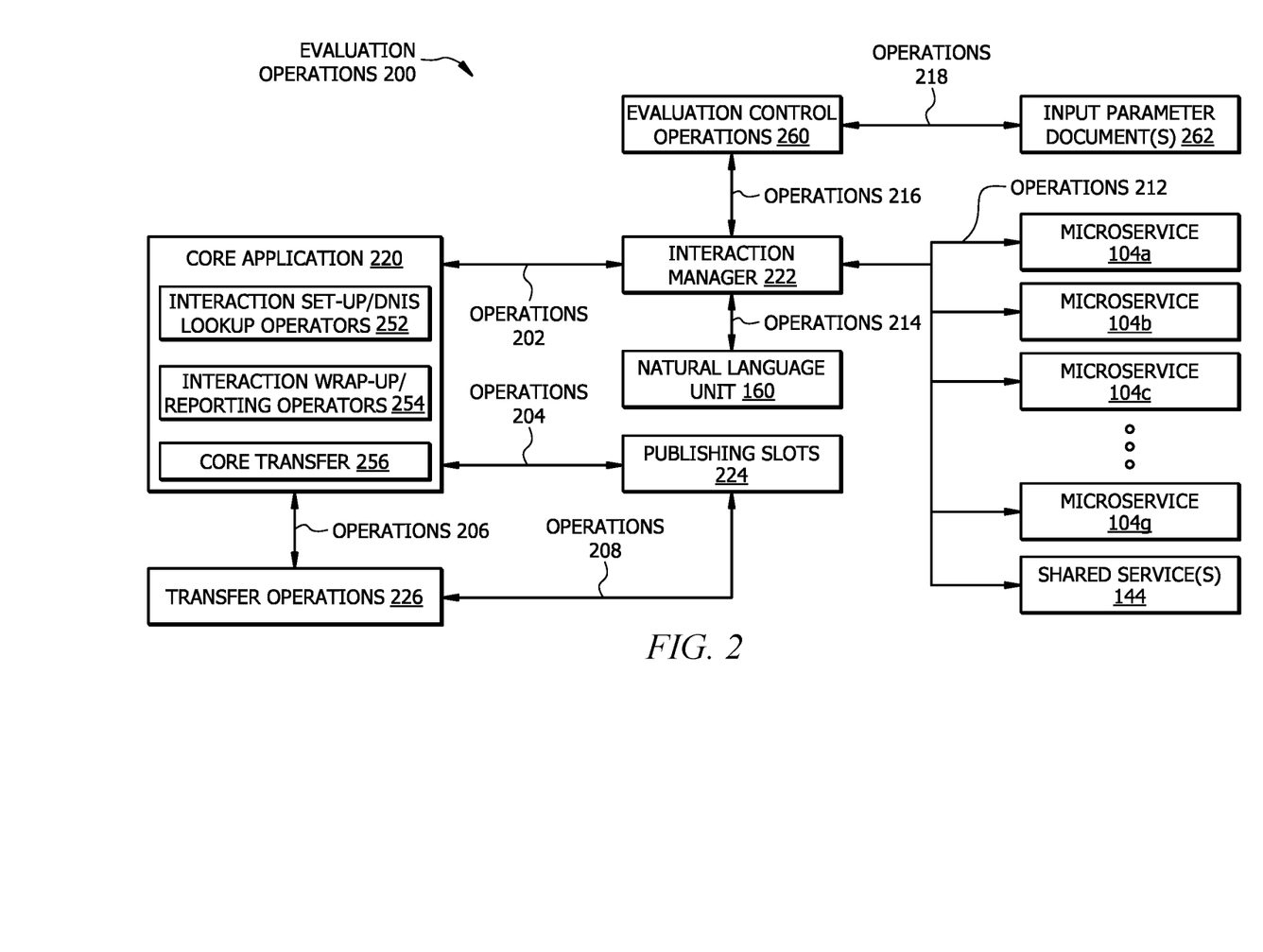
FIG. 2 illustrates an operational flow implemented by the system of FIG. 1 in accordance with one or more embodiments.
Figure 3:
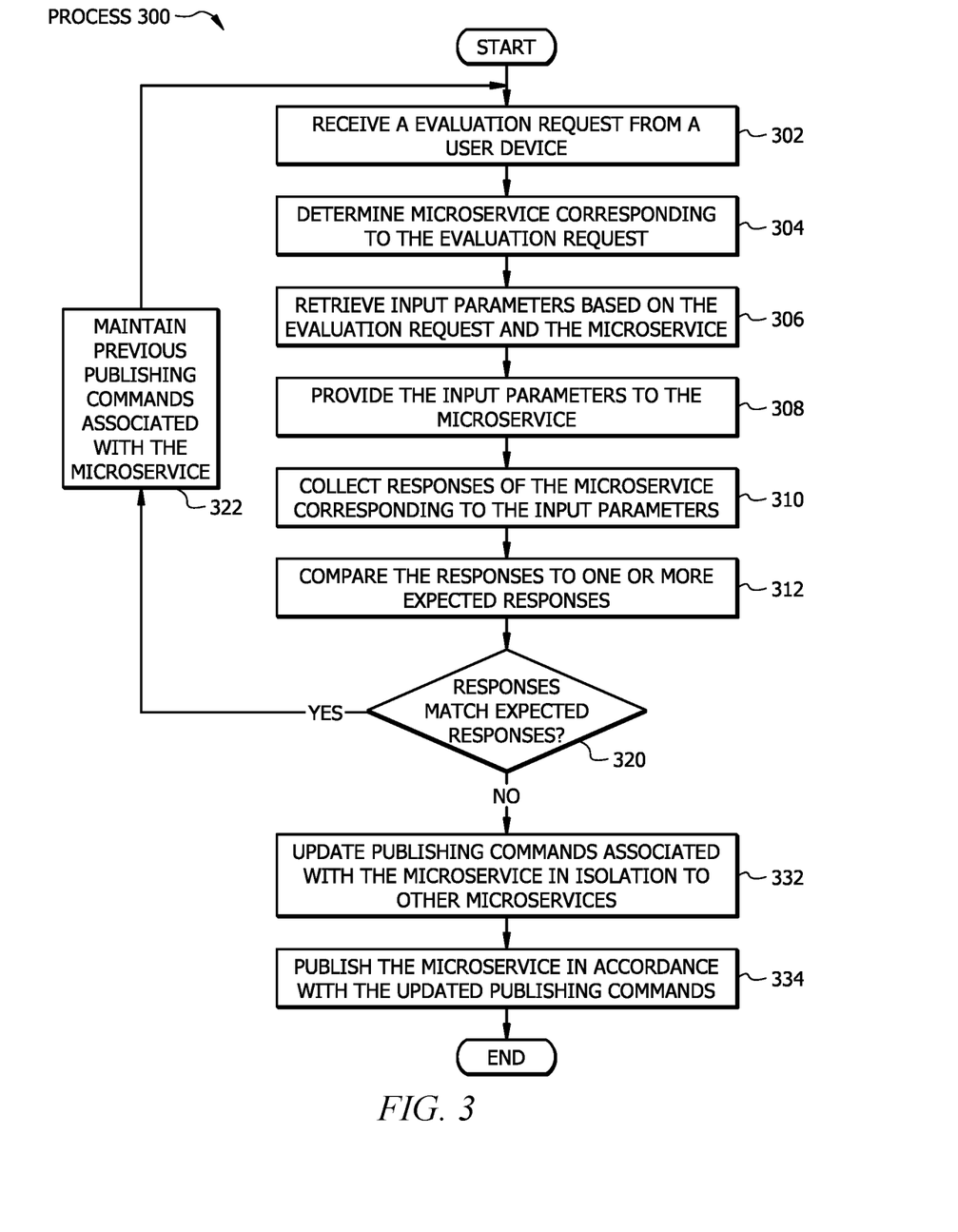
FIG. 3 illustrates an example flowchart of a method comprising the operational flow of FIG. 2 in accordance with one or more embodiments.

As described above, this disclosure provides various systems and methods to evaluate microservices integrated in Interactive Voice Response (IVR) operations. FIG. 1 illustrates a system 100 in which an administration (admin) server 102 evaluates one or more microservices 104 that are integrated in one or more IVR operations 106. FIG. 2 illustrates an operational flow of one or more evaluation operations 200 performed by the system 100 of FIG. 1. FIG. 3 illustrates a process 300 performed by the system 100 of FIG. 1 to implement the evaluation operations 200 of FIG. 2.

System Overview

FIG. 1 illustrates a system 100 configured to evaluate (e.g., test) microservices 104 that are integrated in IVR operations 106 in accordance with one or more embodiments. In the system 100 of FIG. 1, an admin server 102 is communicatively coupled to multiple managed servers 110a-110f (collectively, managed servers 110) and multiple user devices 112a-112c (collectively, user devices 112) via a network 114. In some embodiments, the managed server 110a may be a single managed server communicating with the admin server 102. In other embodiments, the managed server 110b, the managed server 110c, the managed server 110d, and the managed server 110e may be incorporated in a server cluster 115. The server cluster 115 may comprise less or more managed servers 110 than those shown in FIG. 1. In yet other embodiments, the user device 112a, the user device 112b, and the user device 112c may be incorporated in a user device group 116. Each of the user device 112a, the user device 112b, and the user device 112c may be operated by a user 117a, a user 117b, and a user 117c, respectively. The user device group 116 may comprise less or more user devices 112 than those shown in FIG. 1.

In one or more embodiments, the admin server 102 comprises the databases 118, one or more admin server input (I)/output (O) interfaces 120, an admin server processor 126 comprising a processing engine (not shown), and a memory 130. In some embodiments, the databases 118 may be standalone memory storage units or part of the memory 130. In some embodiments, the memory 130 may comprise instructions 132, one or more entitlements 134, multiple server profiles 136, multiple rules and policies 138, the one or more microservices 104, one or more sub-dialogues 140, one or more data processing operations 142, the IVR operations 106, one or more shared services 144, one or more machine learning (ML) algorithms 146, one or more artificial intelligence (AI) commands 148, one or more user device identifiers (IDs) 150, one or more expected requests 152, a natural language unit 160, data exchange information 162, user device feedback 164, one or more publishing commands 166, one or more responses 168 to the requests 152, one or more evaluation configuration commands 170, one or more input parameters 171, and one or more expected responses 172. In turn, referring to the managed server 110a as a non-limiting example, the managed servers may comprise one or more server interfaces 173, one or more server peripherals 174, a server processor 175, one or more server databases 176, and a server memory 178. The server memory 178 may comprise multiple server instructions 180, multiple operation data 182, and one or more local applications 184.

System Components

Admin Servers

The admin server 102 is generally any device or apparatus that is configured to process data and communicate with computing devices (e.g., the managed servers 110 and the user devices 112), additional databases, systems, and the like, via the one or more admin server I/O interfaces 120 (i.e., a user interface or a network interface). The admin server 102 may comprise the admin server processor 126 that is generally configured to oversee operations of the processing engine. The operations of the processing engine are described further below in conjunction with the system 100 described in FIG. 1, the evaluation operations 200 described in FIG. 2, and the process 300 described in FIG. 3.

The admin server 102 comprises multiple databases 118 configured to provide one or more memory resources to the admin server 102 and/or managed servers 110 and the user devices 112. The server 102 comprises the admin server processor 126 communicatively coupled with the databases 118, the admin server I/O interfaces 120, and the memory 130. The admin server 102 may be configured as shown, or in any other configuration. In one or more embodiments, the databases 118 are configured to store data that enables the admin server 102 to configure, manage and coordinate one or more middleware systems. In some embodiments, the databases 118 store data used by the admin server 102 to act as a halfway point in between microservices 104 and other tools or databases.

In one or more embodiments, the admin server I/O interfaces 120 may be configured to enable wired and/or wireless communications. The admin server I/O interfaces 120 may be configured to communicate data between the admin server 102 and other user devices (i.e., the managed servers 110 or the user devices 112), network devices (i.e., routers in the network 114), systems, or domain(s) via the network 114. For example, the admin server I/O interfaces 120 may comprise a WI-FI interface, a LAN interface, a WAN interface, a modem, a switch, or a router. The admin server processor 126 may be configured to send and receive data using the admin server I/O interfaces 120. The admin server I/O interfaces 120 may be configured to use any suitable type of communication protocol. In some embodiments, the admin server I/O interfaces 120 may be an admin console comprising a web browser-based or graphical user interface used to manage a middleware server domain via the admin server 102. A middleware server domain may be a logically related group of middleware server resources that managed as a unit. A middleware server domain may comprise the admin server 102 and one or more managed servers 110. The managed servers 110 may be standalone devices (e.g., the managed server 110a) and/or collected devices in the server cluster 115 (e.g., managed servers 110b-110e). The server cluster 115 may be a group of managed servers that work together to provide scalability and higher availability for the microservices 104. In this regard, the microservices 104 are developed and deployed as part of at least one domain. In other embodiments, one instance of the managed servers 110 in the middleware server domain may be configured as the admin server 102. The admin server 102 provides a central point for managing and configure the managed servers 110, any of the one or more microservices 104, and the one or more local applications 184.

The admin server processor 126 comprises one or more processors communicatively coupled to the memory 130. The admin server processor 126 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The admin server processor 126 may be a programmable logic device, a microcontroller, a microprocessor, or any suitable combination of the preceding. The one or more admin server processors 126 are configured to process data and may be implemented in hardware or software executed by hardware. For example, the admin server processor 126 may be 8-bit, 16-bit, 32-bit, 64-bit or of any other suitable architecture. The admin server processor 126 may include an arithmetic logic unit (ALU) for performing arithmetic and logic operations, processor registers that supply operands to the ALU and store the results of ALU operations, and a control unit that fetches the instructions 132 from the memory 130 and executes them by directing the coordinated operations of the ALU, registers and other components. In this regard, the one or more admin server processors 126 are configured to execute various instructions. For example, the one or more admin server processors 126 are configured to execute the instructions 132 to implement the functions disclosed herein, such as some or all of those described with respect to FIGS. 1-3. In some embodiments, the functions described herein are implemented using logic units, FPGAs, ASICs, DSPs, or any other suitable hardware or electronic circuitry. In one or more embodiments, the admin server I/O interfaces 120 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The admin server I/O interfaces 120 may be configured to support any suitable type of communication protocol as would be appreciated by one of ordinary skill in the art.

The memory 130 may be volatile or non-volatile and may comprise a read-only memory (ROM), random-access memory (RAM), ternary content-addressable memory (TCAM), dynamic random-access memory (DRAM), and static random-access memory (SRAM). The memory 130 may be implemented using one or more disks, tape drives, solid-state drives, and/or the like. The memory 130 is operable to store the instructions 132, the one or more entitlements 134, the server profiles 136 corresponding to one or more managed servers 110 and in association with the one or more entitlements 134 for each server profile 136, the rules and policies 138, the one or more microservices 104, the one or more microservices 104, the one or more sub-dialogues 140, the data processing operations 142, the IVR operations 106, the shared services 144, the ML algorithms 146, the AI commands 148, one or more user device IDs 150, the expected requests 152, the natural language unit 160, the data exchange information 162, the user device feedback 164, the publishing commands 166, the responses 168 to the requests 152, the one or more evaluation configuration commands 170, the one or more input parameters 171, the one or more expected responses 172, and/or any other data or instructions. The instructions 132 may comprise any suitable set of instructions, logic, rules, or code operable to execute the admin server processor 126.

The data exchange information 162 may comprise information associated with one or more communications comprising exchanges of data objects. A data object may be a representation or indicator associated with a digital account, one of the managed servers 110, and/or one of the user devices 112. The data exchange information 162 may comprise one or more data objects associated with one or more incoming requests 152 and/or one or more data objects associated with one or more outgoing responses 168. In some embodiments, the data exchange information may comprise data object information to be exchanged between the user devices 112, the managed servers 110, and/or the admin server 102.

In one or more embodiments, the server profiles 136 may comprise multiple profiles for the managed servers 110. Each server profile 136 may be associated with one or more entitlements 134. The entitlements 134 may indicate that a given server is allowed to access one or more network resources in accordance with the one or more rules and policies 138. The entitlements 134 may indicate that a given managed server 110 is allowed to perform one or more operations in the system 100 (e.g., provide a specific application access to one of the user devices 112). To secure or protect operations of the managed servers 110 from bad actors, the entitlements 134 may be assigned to a given server profile 136 in accordance with updated security information, which may provide guidance parameters to the use of the entitlements 134 based at least upon corresponding rules and policies 138.

The rules and policies 138 may be security configuration commands or regulatory operations predefined by an organization or one or more users 117. In one or more embodiments, the rules and policies 138 may be dynamically defined by the one or more users 117. The rules and policies 138 may be prioritization rules configured to instruct one or more user devices 112 to perform one or more IVR operations 106 or perform one or more operations in the system 100 in a specific request. The one or more rules and policies 138 may be predetermined or dynamically assigned by a corresponding user 117 or an organization associated with the user 117.

In one or more embodiments, the data processing operations 142 comprise access to operational files comprising configuration parameters to perform one or more tasks at the admin server 102. The data processing operations 142 may be configured to enable multiple middleware operations in the system 100. In some embodiments, the data processing operations 142 enable the admin server 102 to perform operations as an AP), an application server running enterprise applications, an application integration server, a content-centric middleware server, a data integration server, or a device middleware server. The data processing operations 142 may maintain information associated with tracking time, an increasing counter, or a number of instances lapsed during pauses of operations in the admin server 102. In one or more embodiments, the data processing operations 142 comprise information concerning any use of the microservices 104 associated with operations caused by the admin server 102 or the managed servers 110. The data processing operations 142 may be operations performed by a given microservice 104 on the admin server 102. Each microservice 104 may comprise unique or combined operations performed in the admin server 102. Further, each microservice 104 may be executed using the admin server 102 and the databases 118. The microservices 104 may be configured to provide specific responses to the requests 152.

In some embodiments, the publishing commands 166 provide triggers in the form of communication or control signals to start operations such as fetching the instructions 132 or running one or more scripts. The data processing operations 142 and the publishing commands 166 may provide service information data indicating any services available in the admin server 102 and the managed servers 110. The data processing operations 142 and the publishing commands 166 may provide lists, security information, and configuration parameters that the admin server 102 uses to set up a specific microservice 104. The data processing operations 142 and the publishing commands 166 may be configuration data that provides starting procedure configuration to the admin server 102. In one or more embodiments, the publishing commands 166 may be optimized instructions that enable establishing of a specific procedure in the middleware server domain. In the example of FIG. 1, the publishing commands 166 comprise performing application operations configured to enable access to multiple middleware scripts the admin server 102.

In one or more embodiments, the publishing commands 166 may be information data representative on one or more microservices 104. The publishing commands 166 may comprise application metadata that extrapolates or summarizes application traffic information associated with one or more microservices 104. In the example of FIG. 1, the microservices 104 comprise an microservice 104a, an microservice 104b, and an microservice 104c among others. The microservices 104 in the admin server 102 may comprise less or more microservices 104 than those shown in FIG. 1. The publishing commands 166 may be active metadata comprising business metadata and/or passive metadata comprising technical metadata. The active metadata is metadata being used by one of the microservices 104 and may be dynamic in nature. The passive metadata may be metadata collected from the microservice 104 during the data processing operations 142 and may be static in nature. In one or more embodiments, the shared services 144 may comprise one or more applications, services, or additional microservices 104 that are associated with one or more entitlements 134 shared across multiple server profiles 136.

The IVR operations 106 may comprise one or more IVR operations 106. The IVR operations 106 may be performed by an automated communication system (e.g., the system 100) that enables incoming communications to access information via voice responses or pre-recorded messages, as well as to utilize menu options via touch tone keypad selection or speech recognition to route the communications to specific departments or specialists. In some embodiments, the admin server 102 comprises a new architecture configured to update the microservices 104 individually instead of updating all the microservices 104 at once. The admin server 102 may be configured to receive incoming communications from one or more user devices 112 and identify a user device ID 150 and a request 152 from the incoming communications. Further, the admin server 102 may be configured to route the request 152 via one or more sub-dialogues 140 to a specific microservice 104 configured to fulfill the request based at least in part upon the user device IDs 150. The user device IDs 150 may associate a user device 112 that generated the incoming communication with the request 152 to one or more of the entitlements 134. The sub-dialogues 140 may identify publishing commands 166 that enable access between the request 152 and the microservice 104 in accordance with the entitlements 134 available to the given user device 112. For example, a user device ID 150 that is not entitled to access a microservice 104a may be presented with an automated response 168 indicating to the user device 112 that the user device ID 150 is not entitled to the microservice 104a. The microservice 104 may be configured to provide a response to the one or more user devices 112. In some embodiments, the user devices 112 may provide positive or negative user device feedback 164 indicating whether the microservice 104 provided a response 168 that fulfilled the request 152. In some embodiments, the admin server 102 may update the microservice 104 in isolation (e.g., individually) without updating all other microservices 104 if the user device feedback 164 is positive. Upon updating the microservice 104 in isolation, the admin server 102 may publish the microservice 104.

In one or more embodiments, the ML algorithm 146 may be executed by the admin server processor 126 to evaluate the requests 152. Further, the ML algorithm 146 may be configured to interpret and transform the publishing commands 166 into structured data sets and subsequently stored as files or tables. The ML algorithm 146 may cleanse, normalize raw data, and derive intermediate data to generate uniform data in terms of encoding, format, and data types. The ML algorithm 146 may be executed to run user queries and advanced analytical tools on the structured data. The ML algorithm 146 may be configured to generate the one or more AI commands 148 based on a current microservice 104 and the existing publishing commands 166. In turn, the admin server processor 126 may be configured to generate the sub-dialogues 140, perform, update or generate the IVR operations 106, and the responses 168 based on the outputs of the ML algorithm 146. The AI commands 148 may be parameters that modify the sub-dialogues 140 and the responses 168. The AI commands 148 may be combined with the existing publishing commands 166 to create the sub-dialogues 140 and the responses 168. In one or more embodiments, the sub-dialogues 140 may be dynamically generated as updates in association with existing publishing commands 166.

The sub-dialogues 140 may be configured to train the ML algorithms 146 and to be controlled by the AI commands 148. In some embodiments, the sub-dialogues 140 differentiate portions of a given request 152 and route the given request 152 to a specific publishing commands 166 to access a microservice 104. In some embodiments, the sub-dialogues 140 may be generated in conjunction with the natural language unit 160, which interprets content in the requests 152 and provides sub-dialogues 140 to route the requests 152 based on the content. For example, a user device 112 may provide a request 152 to the admin server 102 via a telephone call. In this example, the natural language unit 160 may extrapolate content from the request to generate one or more relevant sub-dialogues to route the request 152 to a specific microservice 104. A more detailed example is described in reference to the evaluation operations 200 of FIG. 2. The sub-dialogues may be IVR operations 106 configured to route a request 152 from one microservice 104 to another.

As a non-limiting example, the microservice 104a may receive the request 152 received from the user device 112a based at least in part upon multiple sub-dialogues 140. The microservice 104a may provide a first response 168 to the user device 112a. The first response may comprise replies to a portion of the request 152. Upon transmitting the first response 168 to the user device 112a, the admin server 102 may determine that the entirety of the request 152 is not fulfilled and may determine sub-dialogues 140 to route the rest of the request 152 to the microservice 104b. The microservice 104b may provide a second response 168 to the user device 112a. the second response 168 may comprise replies to the rest of the request 152. In some embodiments, multiple microservices 104 may contribute to fulfill a portion of request 152 from the user device 112a.

These IVR operations 106 may be performed in a continuous process that is updated dynamically (i.e., on demand) or periodically, forming one or more inputs to one or more given microservices 104. In some embodiments, the IVR operations 106 may be configured to cooperate with the natural language unit 160 to generate one or more publishing commands 166 that provide access between the request 152 and a microservice 104 within the system 100. As part of the IVR operations 106, the system 100 may be configured to evaluate every request 152 to identify content along with the natural language unit 160 and enable data exchanges with the microservices 104. The system 100 may be configured to track the microservices 104 as part of an information flow and a version tracking in real time. In some embodiments, the sub-dialogues 140 comprises AI operations that extrapolate relationships with entities defined based on the requests 152. The system 100 performs the sub-dialogues 140 to generate relationship nodes that link elements in the publishing commands 166 with each other and estimate impacts of any changes to the publishing commands 166.

The nodes may be generated as part of the sub-dialogues 140. The sub-dialogues 140 may be configured to validate unique and business relationships associated with the requests 152. The creation of the knowledge graphs may trigger a cognitive engine to create access to one of the microservices 104 in the system 100. The system 100 may be configured to generate plans to find an optimal path to evaluate match publishing commands 166 to a given microservices 104. The microservices 104 may be configured to create one or more responses 168 to a given request 152 based on the contents of the request 152. The microservices 104 may be configured to provide the responses 168 directly to a user device 112 generating the communications comprising the requests 152. In one or more embodiments, the microservices 104 are updated in accordance with the rules and policies 138 dynamically (on demand) or over a predefined time duration. The system 100 may be configured to update a specific microservice 104 in isolation from any other microservices 104.

In one or more embodiments, the databases 118 may be one of the server databases 176 in one of the managed servers 110. In one example, the admin server 102 may determine the admin server processor 126 is available (e.g., running) to perform a specific microservice 104. In another example, the admin server 102 may determine that a specific managed server 110 is running to perform the specific microservice 104 upon receiving a server response indicating that a corresponding managed server 110 is available to perform the microservice 104. In one or more embodiments, the admin server 102 may determine whether a corresponding server processor 175 is available (e.g., running) to perform the specific local application 184. In yet another example, the admin server 102 may determine that the databases 118 are running to provide memory resources to execute the microservice 104 upon receiving a database response indicating that the databases 118 are available to provide memory resources to execute the microservices 104. In one or more embodiments, the admin server 102 may determine whether the databases 118 are available (e.g., running) and may provide the database response. In one or more embodiments, one of the managed servers 110 may determine whether the corresponding server databases 176 are available (e.g., running) and may provide the database response.

In one or more embodiments, the sub-dialogues 140 may be recommendations presented to the user devices 112 based on the expected application responses 154. The sub-dialogues 140 may trigger one or more dynamic configuration commands to route the one or more entitlements 134. In one or more embodiments, the dynamic configuration commands may comprise the one or more publishing commands 166 configured to control operations of the microservices 104 and/or the IVR operations 106. Each configuration command of the publishing commands 166 may be configured to dynamically provide control information to perform one or more of the operations based at least in part upon the analyzed data from the requests 152. The sub-dialogues 140 may provide preventive solutions to changes in a release that may cause unintended impacts to the microservices 104. In any integrated system where multiple microservices 104 interact with each other, the system 100 may thoroughly perform impact checks of any changes to operations and whether modifications are needed to ensure any change is not impacting performance of the microservices 104 upstream/downstream.

In one or more embodiments, the responses 168 may be generated along with one or more sub-dialogues 140 by the microservice 104. The sub-dialogues 140 generated in conjunction with the responses 168 may comprise visual data or audio data to be presented to a given user device 112. In one or more embodiments, the responses 168 may be outputs comprising reports relating to one or more responses 168 provided by one or more microservices 104.

In one or more embodiments, the evaluation configuration commands 170 are commands configured to retrieve the one or more input parameters 171 from one or more documents. The evaluation configuration commands 170 may be configured as part of the one or more data processing operations 142 to evaluate the publishing commands 166. The admin server 102 may be configured to execute the one or more evaluation configuration commands 170 based on whether the request 152 is an evaluation request. The admin server 102 may determine that the request 152 is an evaluation request based on whether the request 152 is received from a user device 112 associated with one or more previous evaluation requests. The admin server 102 may be configured to determine that the request is an evaluation request if the request 152 is received from a user device 112 that is authenticated with the admin server 102 as an evaluation user device. The evaluation user device may be a user device 112 configured to generate one or more evaluation requests comprising a request 152 and/or an identifier informing the admin server 102 is expected to evaluate one or more microservices 104.

In some embodiments, the evaluation configuration commands 170 may be commands configured to trigger update the publishing commands 166 of a microservice 104 in isolation from any other microservices 104. Each microservice 104 may be associated wo one or more input parameters 171. The input parameters 171 may be dedicated for a specific microservice 104 or shared among multiple microservices 104. For each microservice 104 built and/or published, an editable input parameter document 262 (shown in FIG. 2) may be created comprising one or more input parameters 171. The input parameters 171 may be accessed when a given microservice 104 is selected. This editable input parameter document 262 may provide the input parameters 171, the one or more expected responses 172, and one or more additional commands configured to manipulate data in accordance with the rules and policies 138. The expected responses 172 may be one or more responses 168 that are expected as a result of one or more operations performed by the microservices 104 upon receiving the one or more input parameters 171 as triggering inputs.

The evaluation configuration commands 170, the input parameters 171, and/or the expected responses 172 may be updated periodically and/or over a period of time. The evaluation configuration commands 170, the input parameters 171, and/or the expected responses 172 may be updated dynamically and/or immediately upon updating the rules and policies 138. Further, the evaluation configuration commands 170, the input parameters 171, and/or the expected responses 172 may be provided to the admin server 102 along the request 152.

Managed Servers

In some embodiments, the managed servers 110 may be configured to perform one or more of the operations described in reference to the admin server 102. As described above, the managed servers 110 may comprise the server interfaces 173, the server peripherals 174, the server processor 175, the server databases 176, and the server memory 178. The managed servers 110 may be hardware configured to create, transmit, and/or receive information. The managed servers 110 may be configured to receive inputs from a user, process the inputs, and generate data information or command information in response. The data information may include documents or files generated using a graphical user interface (GUI). The command information may include input selections/commands triggered by a user using a peripheral component or one or more server peripherals 174 (i.e., a keyboard) or an integrated input system (i.e., a touchscreen displaying the GUI). The managed servers 110 may be communicatively coupled to the admin server 102 via a network connection (i.e., the server peripherals 174). The managed servers 110 may transmit and receive data information, command information, or a combination of both to and from the admin server 102 via the server interfaces 173. In one or more embodiments, the managed servers 110 are configured to exchange data, commands, and signaling with the admin server 102. In some embodiments, the managed servers 110 are configured to receive at least one firewall configuration from the admin server 102 to implement a firewall (one of the one or more local applications 184) at one of the managed servers 110.

In one or more embodiments, the server interfaces 173 may be any suitable hardware or software (e.g., executed by hardware) to facilitate any suitable type of communication in wireless or wired connections. These connections may comprise, but not be limited to, all or a portion of network connections coupled to additional managed servers 110, the user devices 112, the admin server 102, the Internet, an Intranet, a private network, a public network, a peer-to-peer network, the public switched telephone network, a cellular network, a LAN, a MAN, a WAN, and a satellite network. The server interfaces 173 may be configured to support any suitable type of communication protocol.

In one or more embodiments, the one or more server peripherals 174 may comprise audio devices (e.g., speaker, microphones, and the like), input devices (e.g., keyboard, mouse, and the like), or any suitable electronic component that may provide a modifying or triggering input to the managed servers 110. For example, the one or more server peripherals 174 may be speakers configured to release audio signals (e.g., voice signals or commands) during media playback operations. In another example, the one or more server peripherals 174 may be microphones configured to capture audio signals. In one or more embodiments, the one or more server peripherals 174 may be configured to operate continuously, at predetermined time periods or intervals, or on-demand.

The server processor 175 may comprise one or more processors communicatively coupled to and in signal communication with the server interface 173, the server peripherals 174, and the server memory 178. The server processor 175 is any electronic circuitry, including, but not limited to, state machines, one or more CPU chips, logic units, cores (e.g., a multi-core processor), FPGAs, ASICs, or DSPs. The server processor 175 may be a programmable logic device, a microcontroller, a microprocessor, or any suitable combination of the preceding. The one or more processors in the server processor 175 are configured to process data and may be implemented in hardware or software executed by hardware. For example, the server processor 175 may be an 8-bit, a 16-bit, a 32-bit, a 64-bit, or any other suitable architecture. The server processor 175 may comprise an ALU to perform arithmetic and logic operations, processor registers that supply operands to the ALU, and store the results of ALU operations, and a control unit that fetches software instructions such as instructions 180 from the server memory 178 and executes the server instructions 180 by directing the coordinated operations of the ALU, registers, and other components via a device processing engine (not shown). The server processor 175 may be configured to execute various instructions.

The server memory 178 may comprise multiple operation data 186 and one or more local applications 184 associated with the managed server 110. The operation data 186 may be data configured to enable one or more data processing operations 142 such as those described in relation with the admin server 102. The operation data 186 may be partially or completely different from those comprised in the memory 130. The local applications 184 may be one or more of the microservices 104 described in relation with the admin server 102. In some embodiments, the local applications 184 may be partially or completely different from those comprised in the memory 130.

Network

The network 114 facilitates communication between and amongst the various devices of the system 100. The network 114 may be any suitable network operable to facilitate communication between the admin server 102, the one or more managed servers 110, and the user devices 112 of the system 100. The network 114 may include any interconnecting system capable of transmitting audio, video, signals, data, data packets, messages, or any combination of the preceding. The network 114 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the devices.

User Device

In one or more embodiments, each of the user devices 112 (e.g., the user devices 112a-112c) may be any computing device configured to communicate with other devices, such as the admin server 102, other user devices 112 in the user device group 116, databases, and the like in the system 100. Each of the user devices 112 may be configured to perform specific functions described herein and interact with one or more managed servers 110 and the user devices 112a-112c in the user device group 116. Examples of the user devices 112 comprise, but are not limited to, a laptop, a computer, a smartphone, a tablet, a smart device, an IoT device, a simulated reality device, an augmented reality device, or any other suitable type of device. The requests 152 may be provided by the user devices 112 via one or more interfaces comprising input displays, voice microphones, or sensors capturing gestures performed by a corresponding user 117.

Operational Flow

FIG. 2 illustrates multiple evaluation operations 200, in accordance with one or more embodiments. The evaluation operations 200 may comprise one or more operations 202-218 routed by sub-dialogues 140 generated as part of IVR operations 106. The sub-dialogues 140 may route one or more requests 152 from a core application 220 to an interaction manager 222, one or more publishing slots 224, one or more dialed number transfer operations 226, and/or one or more evaluation control operations 260. In the example of FIG. 2, the interaction manager 222 may trigger access to one or more data processing operations 142, the data exchange information 162, the microservices 104a-104g, the shared services 148a, the natural language unit 158, and the publishing slots 224. Further, the publishing slots 224 may be communicatively coupled to the core application 220, the interaction manager 222, the microservices 104a-104g, and the shared services 144. The evaluation control operations 260 may be communicatively coupled to the core application 220 and/or one or more input parameter documents 262.

The evaluation operations 200 may comprise one or more operations 202 performed between the core application 220 and the interaction manager 222, one or more operations 204 performed between the core application 220 and the publishing slots 224, one or more operations 206 performed between the core application 220 and the transfer operations 226, one or more operations 208 performed between the transfer operations 226 and one or more publishing slots 224, one or more operations 212 performed between the interaction manager 222, the microservices 104a-104g, the publishing slots 224, and the shared services 144, one or more operations 214 between the interaction manager 222 and the natural language unit 158, one or more operations 216 between the interaction manager 222 and the evaluation control operations 260, and one or more operations 218 between the evaluation control operations 260 and the input parameter documents 262.

The evaluation operations 200 may comprise a sub-dialog interface that is common to all received requests 152 for a same core application 220. In this regard, while the example in FIG. 2 shows one core application 220, similar evaluation operations 200 may be performed for multiple core applications. The sub-dialog interface may comprise a NAR log information for reporting and/or tracing of communications started by a given user device 112. The core application may use a dialed number identification service (DNIS) information to trigger sub-dialogues 140 to reach a specific microservice 104.

The core application 220 may perform one or more interaction set-up/lookup operators 252, one or more interaction wrap-up/reporting operators 254, and a core transfer 256. In the example of FIG. 2, the core application 220 may be configured to receive a request 152 at the interaction set-up/DNIS lookup operators 252. The interaction set-up/DNIS lookup operators 252 may be configured to set-up one or more operations to lookup any user devices IDs 150 comprised in the request 152 from the user device 112. The interaction set-up/DNIS lookup operators 252 may associate one of the server profiles 136 in a case where the request 152 is received via one of the managed servers 110. The interaction wrap-up/reporting operators may be configured to generate a report, signaling, or communication confirming or indicating that a communication is completed with a respective user device 112. The core transfer 256 may be configured to perform one or more transfers for one or more microservice 104 or one of the shared services 144. The core transfer 256 may be configured to move a request 152 to one or more other core applications 220. Further, the core transfer 256 may be configured to transfer the requests 152 to the interaction manager 222 via the operations 202, to the publishing slots 224 via the operations 204, and the transfer operations 226 via the transfer operations 226.

In one or more embodiments, the interaction manager 222 may be a customer satisfaction support configured to scan the requests 152 and determine whether the requests may be fulfilled by one of the microservices 104 or the shared services 144. The natural language unit 158 may contribute to determine whether the request 152 comprised specific language via the operations 214. The operations 212 may comprise transferring requests 152 from the interaction manager 222 to one or more of the microservices 104 or the shared services 144 upon determining a microservice 104 configured to provide a response 168 to the response 168. The publishing slots 224 may be configured to enable one or more microservices 104 to be updated in accordance with the one or more rules and policies 138. In particular, the publishing slots 224 may comprise and update the publishing commands 166. The transfer operations 226 may be identification service (DNIS)/line of business (LOB) operations configured to receive the requests from the core transfer 256 via the operations 206. The transfer operations 226 may be configured to provide one or more user device feedback 164 to the publishing slots 224 via the operations 208 to determine whether to update one of the microservice 104.

In one or more embodiments, the evaluation control operations 260 may configured to provide execution of the one or more evaluation configuration commands 170. The evaluation control operations 260 may trigger one or more operations 216 upon receiving the request 152 from interaction manager 222. In some embodiments, the evaluation control operations 260 may trigger operations 218 to retrieve (e.g., fetch or obtain) the input parameters 171 from the input parameter documents 262. As described above, the input parameter documents 262 may be files, scripts, and/or ledgers comprising the input parameters 171, one or more actionable commands, and/or triggering commands. As part of the operations 218, the evaluation control operations 260 may select one or more input parameter documents 262 associated to a specific microservice 104. The admin server 102 may be configured to retrieve one or more input parameters 171 from the input parameter documents 262 in accordance with the rules and policies 138 and/or the request 152. In this regard, the evaluation control operations 260 may be configured to provide the input parameters 171 to the interaction manager 222 via the operations 216 and/or one or more of the microservice 104.

In some embodiments, the microservices 104a-104g may comprise less or more that the microservices 104 shown in FIG. 2. The microservices 104a-104g may comprise ID/authorization services configured to confirm entitlements 134 associated with certain user device IDs 150, offer management services configured to provide data processing operations 142 that enable faster or easier access to data objects to certain user devices 112 based at least upon corresponding user device IDs 150, access authorization services configured to provide configured to provide account profile controls and/or modifications, services to evaluate data objects to be exchanged (e.g., suggestion management services), account selection services, data exchange information services configured to determine senders and recipients of data objects, and the like.

In one or more embodiments, the shared services 144 comprises configuration set-ups for one or more core applications, reporting services configured to provide the reports to the one or more user devices 112, call-transfer services configured to transfer caller information to a specific API in the admin server 102, preference services associated with multiple core applications 220, one or more Webtool interfaces, one or more developer backdoor services, one or more credit card services for data objects and data exchange operations, open source services, one or more data streaming platforms, and the like.

The evaluation operations 200 may comprise less or more than the operations 202-218 shown in FIG. 2. In some embodiments, the operations 202-218 may be in the order flow shown or other operational flow.

Process to Evaluate Microservices Integrated in Interactive Voice Response (IVR) Operations FIG. 3 illustrates an example flowchart of a process 300 to evaluate microservices 104 integrated in the IVR operations 106, in accordance with one or more embodiments. Modifications, additions, or omissions may be made to the process 300. The process 300 may comprise more, fewer, or other operations than those shown below. For example, operations may be performed in parallel or in any suitable order. While at times discussed as the admin server 102, or components of any of thereof performing operations described in the operations 302-324, any suitable system or components of the s system 100 may perform one or more operations of the process 300. For example, one or more operations of the process 300 may be implemented, at least in part, in the form of instructions 132 of FIG. 1, stored on non-transitory, tangible, machine-readable media (e.g., the admin server memory 130 or non-transitory computer readable medium storing the instructions 132 of FIG. 1) that when run by one or more processors (e.g., the admin processor 126 of FIG. 1) may cause the one or more processors to perform operations described in the operations 302-324.

In one or more embodiments, the admin server 102 is configured to integrate microservices 104 into the IVR operations 106. In the example of FIG. 3, the process 300 starts at operation 302, where the admin server 102 receives a request 152 from one or more user devices 112. The request 152 may comprise an evaluation request to perform multiple evaluation control operations 260. At operation 304, the admin server 102 determines at least one microservice 104 corresponding to the request 152. The admin server 102 may be configured to determine multiple sub-dialogues 140 corresponding to the request 152. The admin server 102 may be configured to generate the sub-dialogues 140 as part of one or more IVR operations 106. At operation 306, the admin server 102 retrieves one or more input parameters 171 based on the request 152 and the at least one microservice 104. The evaluation control operations 260 may be configured to retrieve the one or more input parameters 171 from at least one input parameter document 262. The one or more input parameters 171 may include multiple triggering commands that the evaluation control operations 260 are configured to use as inputs for a specific microservice 104. At operation 308, the admin server 102 provides the one or more input parameters 171 to the at least one microservice 104. The admin server 102 may be configured to route the request 152 to a microservice 104 based at least in part upon the sub-dialogues 140. The microservice 104 may be selected for being configured to fulfill the request 152. The admin server 102 may be configured to determine the publishing commands 166 associated with routing the input parameters 171 the microservice 104. At this stage, the input parameters 171 associated with the request 152 may be provided to the microservice 104 in accordance with one or more evaluation configuration commands 170. At operation 310, the admin server 102 collects at least one response 168 of the microservices 104 corresponding to the input parameters 171. Herein, the admin server 102 may be configured to determine multiple publishing commands 166 associated with the microservice 104. The publishing commands 166 may be part of the instructions 132 configured to enable the microservice 104 to access the request 152 and generate one or more responses 168 based on the request 152. The admin server 102 may generate a response 168 to the request 152 associated with the microservice 104. The admin server 102 may be configured to, in conjunction with generating the response 168 to the request 152 associated with the microservice 104 and present the response 168 to the user device 112. In this regard, the admin server 102 may execute one or more of the evaluation configuration commands 170 to match the input parameters 171 to one or more expected responses 172.

The process 300 proceeds to operation 320, where the admin server 102 determines whether the response 168 matches one or more expected responses 172. The admin server 102 may execute the evaluation configuration commands 170 to compare the response 168 to the expected responses 172. If the admin server 102 determines that the response 168 does not match at least one of the expected responses 172 (e.g., NO), the process 300 proceeds to operation 322. In this regard, the admin server 102 is configured to determine that the response 168 matches the expected responses 172. At operation 322, the admin server 102 is configured to maintain previous publishing commands 166 associated with the microservice 104. The admin server 102 may determine not to update the publishing commands 166 if the response 168 is found in the expected responses 172. If the admin server 102 determines that the response 168 matches at least one of the expected responses 172 (e.g., YES), the process 300 proceeds to operation 332. The admin server 102 may determine to update the publishing commands 166 if the response 168 is not found in the expected responses 172. In this regard, the admin server 102 is configured to determine that the response 168 does not match the expected responses 172. At operation 332, the admin server 102 is configured to update the publishing commands 166 associated with the microservice 104 (e.g., the microservice 104a, the microservice 104b, and the like)

in isolation to other microservices 104. In response to determining that the response 168 does not match any of the expected responses 172, the admin server 102 may be configured to update the publishing commands 166 in accordance with the rules and policies 138. The publishing commands 166 may be associated with the microservice 104 being updated in isolation from the plurality of microservices 104. The updates may be configured to provide one or more evaluation configuration commands 170 configured to enable the microservice 104 to generate at least one of the expected responses 172. In particular, the microservice 104 is updated to interpret the one or more inputs parameters 171 to generate one or more of the expected response 172.

The process 300 may end at operation 334, where the admin server 102 publishes the microservice 104 in accordance with the updated publishing commands 166.

Scope of the Disclosure

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. An apparatus, comprising:
a memory, configured to store:
publishing commands configured to enable microservices integrated into a plurality of Interactive Voice Response (IVR) operations to access incoming requests;
input parameters, each input parameter indicating an input for at least one of the microservices of a plurality of microservices; and
expected responses, each expected response indicating an expected output for at least one of the microservices; and
a processor communicatively coupled to the memory and configured to:
receive a first evaluation request to perform a first plurality of data processing operations;
determine a first microservice of the microservices configured to fulfill the first evaluation request;
determine a first plurality of publishing commands associated with the first microservice, the first plurality of publishing commands being instructions configured to enable the first microservice to access the first evaluation request;
obtain a first plurality of input parameters corresponding to the first microservice;
generate a first response to the first evaluation request associated with the first microservice;
in response to generating the first response, compare the first response to a first expected response;
determine whether the first response matches the first expected response;
in response to determining that the first response does not match the first expected response, update the first plurality of publishing commands in accordance with a plurality of rules and policies, the first plurality of publishing commands associated with the first microservice being updated in isolation from the plurality of microservices; and
publish the first microservice.

2. The apparatus of claim 1, wherein the processor is further configured to:
in conjunction with receiving the first evaluation request to perform the first plurality of data processing operations, receive a second evaluation request to perform a second plurality of data processing operations;
determine a second microservice configured to fulfill the second evaluation request;
determine a second plurality of publishing commands associated with the second microservice, the second plurality of publishing commands being instructions configured to enable the second microservice to access the second evaluation request;
obtain a second plurality of input parameters corresponding to the second microservice;
generate a second response to the second evaluation request associated with the second microservice;
in response to generating the second response, compare the second response to a second expected response;
determine whether the second response matches the second expected response;
in response to determining that the second response does not match the first expected response, update the second plurality of publishing commands in accordance with the plurality of rules and policies, the second plurality of publishing commands associated with the second microservice being updated in isolation from the microservices; and
publish the second microservice.

3. The apparatus of claim 1, wherein the processor is further configured to:
receive a second evaluation request to perform a second plurality of data processing operations;
determine a second microservice configured to fulfill the second evaluation request;
determine a second plurality of publishing commands associated with the second microservice, the second plurality of publishing commands being instructions configured to enable the second microservice to access the second evaluation request;
obtain a second plurality of input parameters corresponding to the second microservice;
generate a second response to the second evaluation request associated with the second microservice;
in response to generating the second response, compare the second response to a second expected response;
determine whether the second response matches the second expected response; and in response to determining that the second response matches the first expected response, maintain the second plurality of publishing commands associated with the second microservice.

4. The apparatus of claim 1, wherein the first plurality of input parameters are obtained from editable input parameter documents.

5. The apparatus of claim 1, wherein the processor is further configured to:
in conjunction with generating the first response to the first evaluation request associated with the first microservice, present the first response to a user device.

6. The apparatus of claim 1, wherein the processor is further configured to:
in conjunction with receiving the first evaluation request to perform the first plurality of data processing operations, receive a user device identifier from a user device;
determine a plurality of entitlements corresponding to the user device identifier; and
obtain the first plurality of input parameters corresponding to the first microservice based at least in part upon the plurality of entitlements.

7. The apparatus of claim 1, wherein the microservices comprise at least one of access authorization services, suggestion management services, account selection services, or data exchange information services.

8. A method, comprising:
receiving a first evaluation request to perform a first plurality of data processing operations;
determining a first microservice configured to fulfill the first evaluation request, the microservices being integrated in a plurality of Interactive Voice Response (IVR) operations;
determining a first plurality of publishing commands associated with the first microservice, the first plurality of publishing commands being instructions configured to enable the first microservice to access the first evaluation request;
obtaining a first plurality of input parameters corresponding to the first microservice, each input parameter indicating an input for at least one of the microservices;
generating a first response to the first evaluation request associated with the first microservice;
in response to generating the first response, comparing the first response to a first expected response, each expected response indicating an expected output for at least one of the microservices;
determining whether the first response matches the first expected response;
in response to determining that the first response does not match the first expected response, updating the first plurality of publishing commands in accordance with a plurality of rules and policies, the first plurality of publishing commands associated with the first microservice being updated in isolation from a plurality of microservices; and
publishing the first microservice.

9. The method of claim 8, further comprising:
in conjunction with receiving the first evaluation request to perform the first plurality of data processing operations, receiving a second evaluation request to perform a second plurality of data processing operations;
determining a second microservice of the plurality of microservices configured to fulfill the second evaluation request;
determining a second plurality of publishing commands associated with the second microservice, the second plurality of publishing commands being instructions configured to enable the second microservice to access the second evaluation request;
obtaining a second plurality of input parameters corresponding to the second microservice;
generating a second response to the second evaluation request associated with the second microservice;
in response to generating the second response, comparing the second response to a second expected response;
determining whether the second response matches the second expected response;
in response to determining that the second response does not match the first expected response, updating the second plurality of publishing commands in accordance with the plurality of rules and policies, the second plurality of publishing commands associated with the second microservice being updated in isolation from the plurality of microservices; and
publishing the second microservice.

10. The method of claim 8, further comprising:
receiving a second evaluation request to perform a second plurality of data processing operations;
determining a second microservice of the plurality of microservices configured to fulfill the second evaluation request;
determining a second plurality of publishing commands associated with the second microservice, the second plurality of publishing commands being instructions configured to enable the second microservice to access the second evaluation request;
obtaining a second plurality of input parameters corresponding to the second microservice;
generating a second response to the second evaluation request associated with the second microservice;
in response to generating the second response, comparing the second response to a second expected response;
determining whether the second response matches the second expected response; and
in response to determining that the second response matches the first expected response, maintaining the second plurality of publishing commands associated with the second microservice.

11. The method of claim 8, wherein the first plurality of input parameters are obtained from editable input parameter documents.

12. The method of claim 8, further comprising:
in conjunction with generating the first response to the first evaluation request associated with the first microservice, presenting the first response to a user device.

13. The method of claim 8, further comprising:
in conjunction with receiving the first evaluation request to perform the first plurality of data processing operations, receiving a user device identifier from a user device;
determining a plurality of entitlements corresponding to the user device identifier; and
obtaining the first plurality of input parameters corresponding to the first microservice based at least in part upon the plurality of entitlements.

14. The method of claim 8, wherein the plurality of microservices comprise at least one of access authorization services, suggestion management services, account selection services, or data exchange information services.

15. A non-transitory computer readable medium storing instructions that when executed by a processor cause the processor to:
- receive a first evaluation request to perform a first plurality of data processing operations;
- determine a first microservice of a plurality of microservices configured to fulfill the first evaluation request, the plurality of microservices being integrated in a plurality of Interactive Voice Response (IVR) operations;
- determine a first plurality of publishing commands associated with the first microservice, the first plurality of publishing commands being instructions configured to enable the first microservice to access the first evaluation request;
- obtain a first plurality of input parameters corresponding to the first microservice, each input parameter indicating an input for at least one of the or more microservices of the plurality of microservices;
- generate a first response to the first evaluation request associated with the first microservice;
- in response to generating the first response, compare the first response to a first expected response, each expected response indicating an expected output for at least one of the at least one of the microservices;
- determine whether the first response matches the first expected response;
- in response to determining that the first response does not match the first expected response, update the first plurality of publishing commands in accordance with a plurality of rules and policies, the first plurality of publishing commands associated with the first microservice being updated in isolation from the plurality of microservices; and
- publish the first microservice.

16. The non-transitory computer readable medium of claim 15, wherein the instructions further cause the processor to:
- in conjunction with receiving the first evaluation request to perform the first plurality of data processing operations, receive a second evaluation request to perform a second plurality of data processing operations;
- determine a second microservice of the plurality of microservices configured to fulfill the second evaluation request;
- determine a second plurality of publishing commands associated with the second microservice, the second plurality of publishing commands being instructions configured to enable the second microservice to access the second evaluation request;
- obtain a second plurality of input parameters corresponding to the second microservice;
- generate a second response to the second evaluation request associated with the second microservice;
- in response to generating the second response, compare the second response to a second expected response;
- determine whether the second response matches the second expected response;
- in response to determining that the second response does not match the first expected response, update the second plurality of publishing commands in accordance with the plurality of rules and policies, the second plurality of publishing commands associated with the second microservice being updated in isolation from the plurality of microservices; and
- publish the second microservice.

17. The non-transitory computer readable medium of claim 15, wherein the instructions further cause the processor:
- receive a second evaluation request to perform a second plurality of data processing operations;
- determine a second microservice of the plurality of microservices configured to fulfill the second evaluation request;
- determine a second plurality of publishing commands associated with the second microservice, the second plurality of publishing commands being instructions configured to enable the second microservice to access the second evaluation request;
- obtain a second plurality of input parameters corresponding to the second microservice;
- generate a second response to the second evaluation request associated with the second microservice;
- in response to generating the second response, compare the second response to a second expected response;
- determine whether the second response matches the second expected response; and
- in response to determining that the second response matches the first expected response, maintain the second plurality of publishing commands associated with the second microservice.

18. The non-transitory computer readable medium of claim 15, wherein the first plurality of input parameters are obtained from editable input parameter documents.

19. The non-transitory computer readable medium of claim 15, wherein the instructions further cause the processor to:
- in conjunction with generating the first response to the first evaluation request associated with the first microservice, present the first response to a user device.

20. The non-transitory computer readable medium of claim 15, wherein the instructions further cause the processor to:
- in conjunction with receiving the first evaluation request to perform the first plurality of data processing operations, receive a user device identifier from a user device;
- determine a plurality of entitlements corresponding to the user device identifier; and
- obtain the first plurality of input parameters corresponding to the first microservice based at least in part upon the plurality of entitlements.

* * * * *